June 26, 1962  G. R. MOFFITT  3,041,486
VARIABLE RELUCTANCE DEVICE
Filed April 15, 1960  3 Sheets-Sheet 1

INVENTOR.
GUY R. MOFFITT
BY Henry L. Skeuier
ATTORNEY

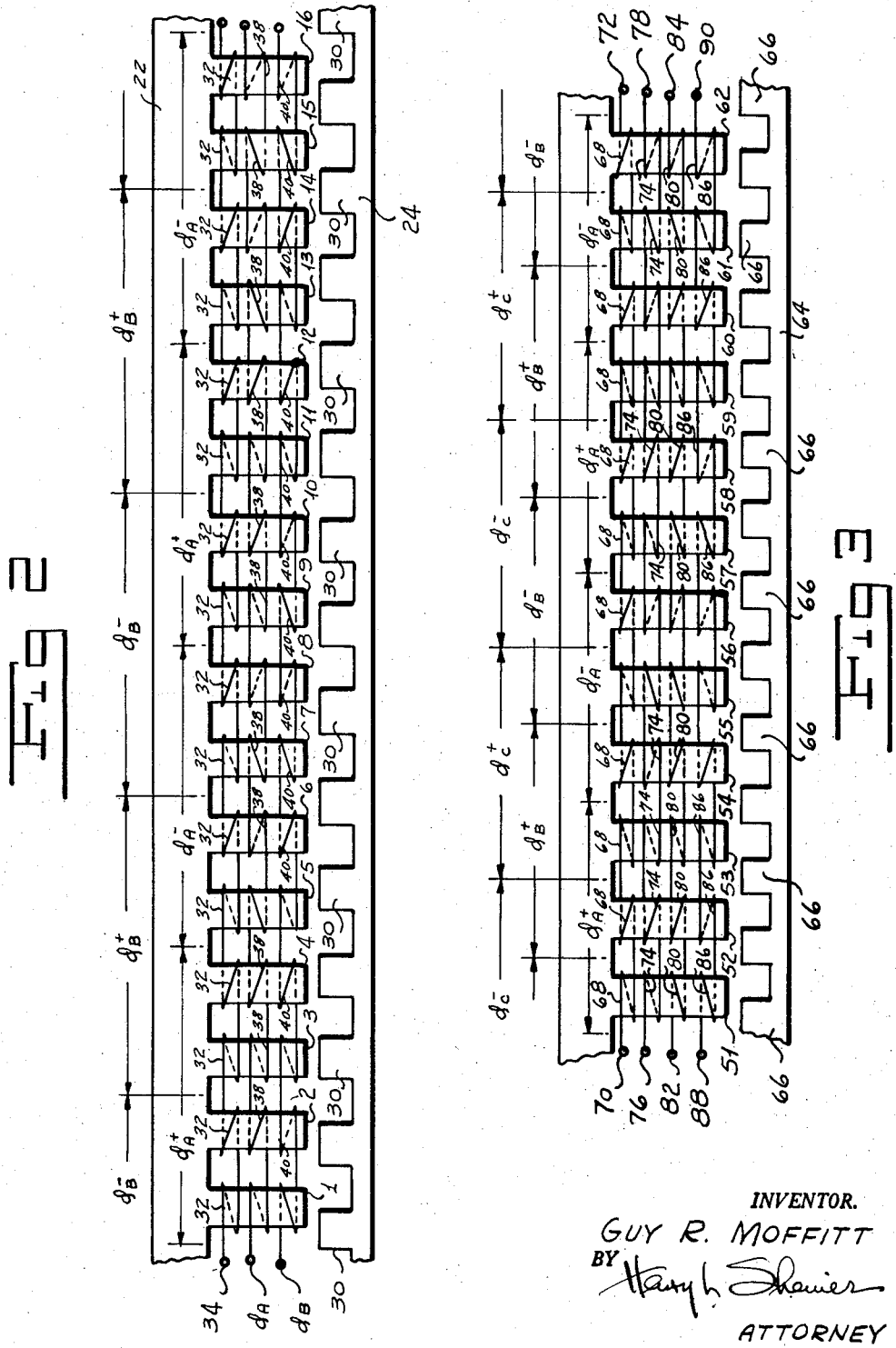

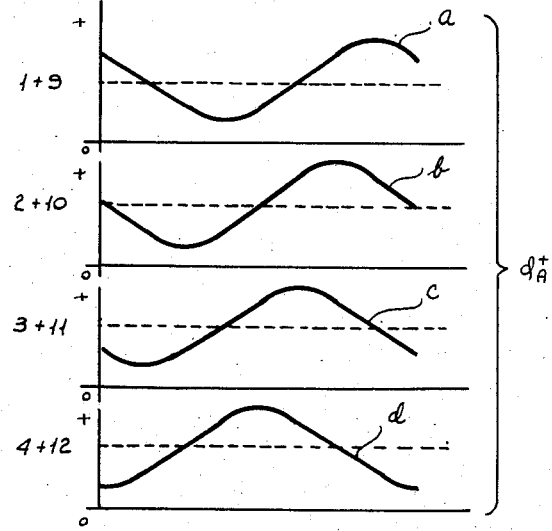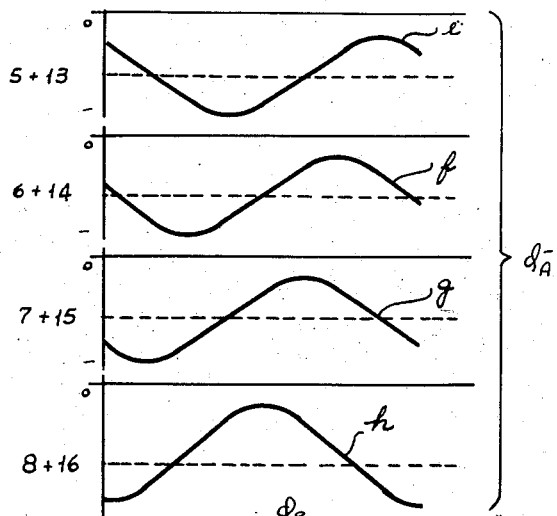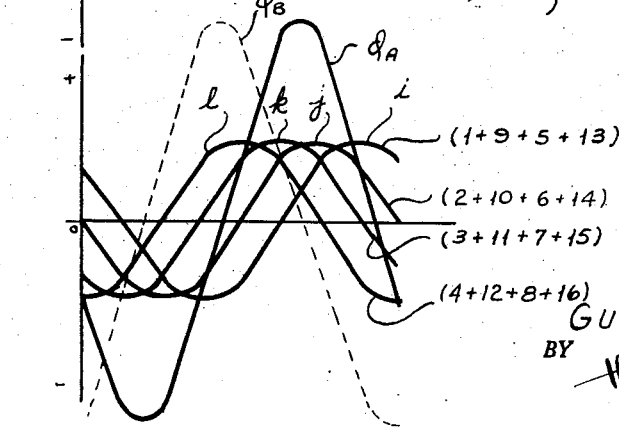

United States Patent Office 3,041,486
Patented June 26, 1962

3,041,486
VARIABLE RELUCTANCE DEVICE
Guy R. Moffitt, Milford, Conn., assignor to United Aircraft Corporation, East Hartford, Conn., a corporation of Delaware
Filed Apr. 15, 1960, Ser. No. 22,553
10 Claims. (Cl. 310—168)

My invention relates to a variable reluctance device and more particularly to an improved variable reluctance device adapted to produce an output wave form which very closely approaches that of a pure sinusoid.

Devices are known in the prior art in which a rotor turns relative to a stator to vary the reluctance of the path for flux coupling the coils of a winding to produce alternating output voltage. These variable reluctance devices of the prior art embody a number of defects. First, owing to "runout" of the rotor with respect to the stator, an error may be produced which is manifest either as a modulation of the carrier by the fundamental voltage of rotation where the device is used as a frequency generator or as an error in output magnitude where the device is used as a resolver. Further, the output voltages produced by these devices include a large number of harmonics with the result that the output voltage wave form does not approximate a sine wave as closely as is desirable.

I have invented a variable reluctance device which overcomes the defects of variable reluctance devices of the prior art. My device substantially eliminates errors which might otherwise result from runout between the rotor and the stator. My device substantially eliminates even order harmonics from the output voltage of the device. I so arrange my variable reluctance device as to produce an output in which odd order harmonics are substantially reduced.

One object of my invention is to provide a variable reluctance device which overcomes the defects of variable reluctance devices of the prior art.

Another object of my invention is to provide a variable reluctance device in which error resulting from runout between the rotor and the stator is substantially eliminated.

A further object of my invention is to provide a variable reluctance device having an output which includes substantially no even order harmonics.

Still another object of my invention is to provide a variable reluctance device in which the odd order harmonic content of the output is substantially reduced.

Other and further objects of my invention will appear from the following description.

In general my invention contemplates the provision of a variable reluctance device in which, upon relative rotation between the stator and a rotor having a number of teeth which differs by at least two teeth from the number of stator poles, respective groups of phase displaced voltages are produced in sets of phase winding coils carried by the stator poles. In combining the voltages of one set of phase winding coils to produce one phase of the output, I add voltages produced in coils having 180° of mechanical separation to eliminate errors resulting from runout between the rotor and the stator. I add voltages of the respective groups having 180° of electrical displacement to produce respective phase-shifted resultant voltages in which even order harmonics are substantially eliminated. I add the phase-displaced resultant voltages to produce one phase of the output voltage in which the odd order harmonic content is substantially reduced. I combine the voltages of the phase winding coils of the other set in a similar manner to produce the other phase of the output. As a result, the output phase of my variable reluctance device generate wave forms which are very nearly sinusoidal.

In the accompanying drawings which form part of the instant specification and which are to be read in conjunction therewith and in which like reference numerals are used to indicate like parts in the various views:

FIGURE 2 is a developed view of the form of my variable reluctance device shown in FIGURE 1.

FIGURE 3 is a developed view of an alternate form of my variable reluctance device having three output phases.

FIGURE 4 is a plot illustrating the combination of voltages of coils displaced 180° mechanically to eliminate error owing to runout in my variable reluctance device.

FIGURE 5 is a plot illustrating the addition of voltages displaced by 180° electrically to produce resultant voltages and illustrating the addition of the resultant voltages to produce one phase of the output of my variable reluctance device.

Figure 1:
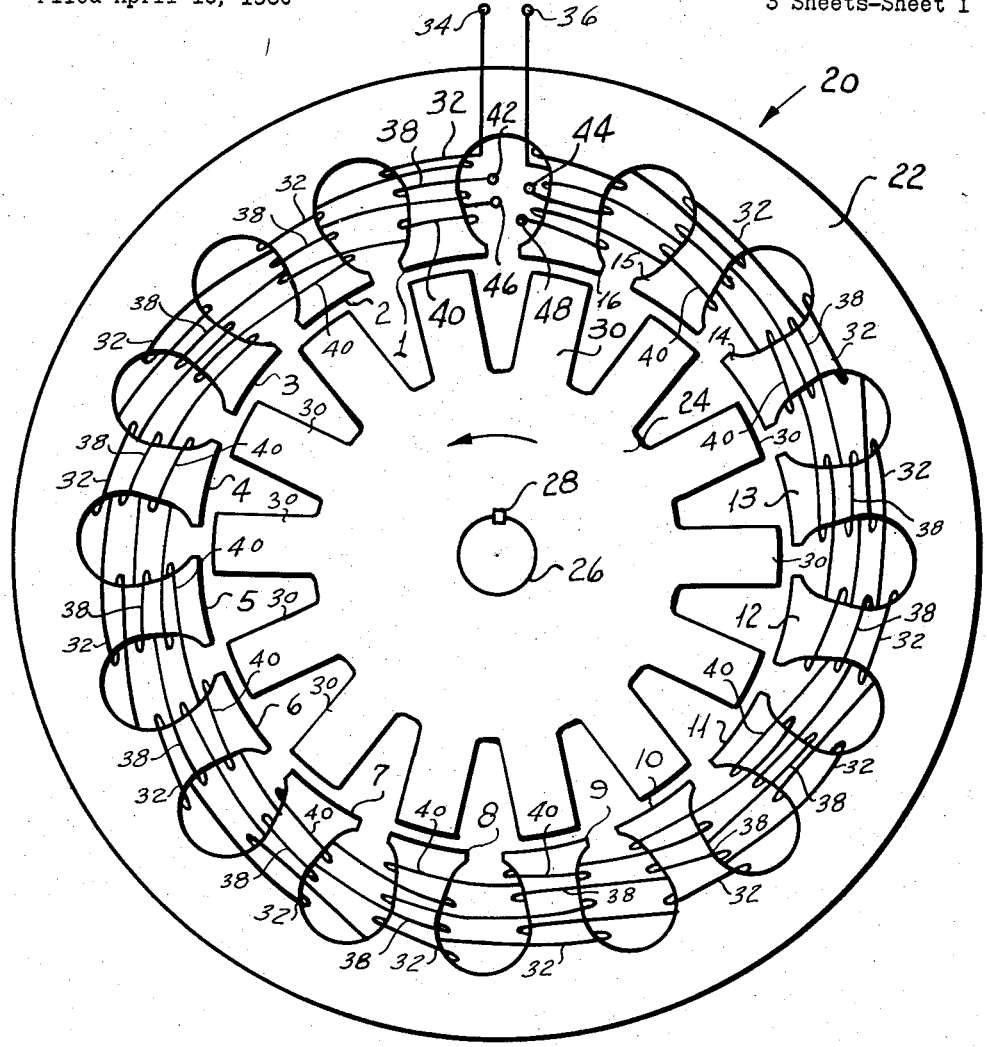
FIGURE 1 is an end elevation of one form of my variable reluctance device having two output phases.

Referring now to FIGURES 1 and 2 of the drawings, my variable reluctance generator, indicated generally by the reference character 20, includes a stator 22 and a rotor 24 secured to a shaft 26 by any suitable means such as by a key 28. The stator 22 is built up from a plurality of laminations of magnetic material stacked with zero skew. The stacked laminations of the stator 22 provide a plurality of poles, which in the form of my variable reluctance generator shown in FIGURE 1 are indicated by the respective reference characters 1 to 16. I so shape the lamination teeth as to provide poles 1 to 16 having a shape which aids in generating a sinusoidal voltage in the manner to be described hereinafter.

The rotor 24 is made up of a plurality of laminations which are grain-oriented to ensure uniform reluctance distribution. The laminations making up the rotor 24 are stacked with their teeth oriented with reference to each other to provide the rotor with fourteen teeth 30 in the form of my invention shown in FIGURE 1 for a purpose which will be described in detail hereinafter.

The stator teeth 1 to 16 carry respective excitation winding coils 32, alternate ones of which, around the stator, are wound in the opposite sense. I connect the excitation coils 32 in series between a pair of terminals 34 and 36 to which the input voltage, which may be direct current or which may be alternating current, is applied. Each of the stator poles 1 to 16 also carries a first or "A" phase winding coil 38. I so wind the respective coils 38 making up the "A" phase that the coils 38 carried by stator poles 1 to 4 are wound in the same sense as the excitation winding coils 32, the coils 38 carried by poles 5 to 8 are wound on the poles in a sense opposite to that in which the corresponding excitation coils are wound, the coils 38 carried by poles 9 to 12 are wound in the same sense as are the excitation coils and the coils 38 carried by poles 13 to 16 are wound in the opposite sense to the excitation windings 32 carried by these poles.

Each of the poles 1 to 16 carries a second or "B" phase winding coil 40. I so wind the coils 40 on the stator poles 1 to 16 that the group of windings 40 carried by poles 3 to 6 and the group of windings 40 carried by poles 11 to 14 are wound in the same sense as the excitation windings on the poles and so that the group of windings 40 carried by poles 15, 16, 1 and 2 and the group of windings 40 carried by poles 7 to 10 are wound in the opposite sense to the excitation windings 32 carried by these coils.

I connect the coils 38 in series between a pair of output terminals 42 and 44 carrying the "A" phase output. I connect the coils 40 between a pair of terminals 46 and 48 carrying the "B" phase output.

From the structure just described it will be seen that each output phase of my variable reluctance device includes four groups of voltages. Owing to the fact that the rotor 24 has a number of teeth 30 which is different from the number of poles 1 to 16 of the stator 22, the respective voltages of each group of phase windings are phase displaced with respect to each other. Since there is a difference of at least two between the rotor teeth 30 and the stator poles 1 to 16, a pair of diametrically opposite teeth 30 occupy corresponding positions with respect to a pair of opposite poles of the poles 1 to 16 at any relative position of stator 22 and rotor 24. If, owing to runout between the rotor and the stator, the flux linking one of the opposite coils increases, at the same time the flux linking the other coil decreases. Since all the coils of one phase are connected in series, the increase in flux linking one coil is counterbalanced by a decrease in flux linking an opposite coil with the result that the output includes substantially no error owing to this runout.

For purposes of clarity in FIGURE 4 I have shown a series of curves which illustrate the operation of my variable reluctance device. Assuming an alternating current input, the curves of FIGURE 4 illustrate the envelopes of the voltages produced in the respective coils 38 of the "A" phase winding. The top curve $a$, for example, represents the envelope of the voltages generated in the coils 38 carried by the poles 1 and 9. For the reasons which have been pointed out hereinabove, it will be clear that this wave form includes substantially no error owing to runout of the rotor with respect to the stator, since any variation in the voltage in the coil 38 carried by pole 1 is counterbalanced by an equal and opposite change in the voltage generated in the coil 38 carried by pole 9. The remainder of the first eight curves $b$ to $g$ from top to bottom in FIGURE 4 illustrate the envelopes of the combined voltages of the respective pairs of coils 38 carried by the pairs of poles 2 and 10, 3 and 11, 4 and 12, 5 and 13, 6 and 14, 7 and 15, and 8 and 16.

In FIGURE 4 it will be apparent that the sense of the voltage under the envelope represented by the curve $a$ is opposite to sense of the voltage represented by the curve $e$. That is, considering the voltage under the curve $a$ as positive, the combined voltage of the coils on poles 1 and 9 is positive, and the voltage enclosed by the curve $e$ is negative. These voltages are 180° out of phase. Similarly, the respective voltages enclosed by curves $b$ to $d$ are 180° out of phase with the voltages enclosed by the curves $f$ to $h$. Moreover, while I have represented these envelopes as being substantially sinusoidal in form, it will be appreciated that the respective curves $a$ to $h$ include both even order and odd order harmonics.

Referring now to FIGURE 5, I combine the voltage enclosed within the curve $a$ with that enclosed within the curve $e$ to produce a resultant voltage which is referenced to zero and which has substantially no even order harmonics. I have indicated this voltage as a resultant voltage $i$ in FIGURE 5. In a similar manner I combine the respective voltages $b$, $c$, and $d$ with the voltages under curves $f$, $g$ and $h$ to produce resultant voltages $j$, $k$, and $l$ referenced to zero and having substantially no even order harmonics. As will be apparent from FIGURE 5, the voltages $i$, $j$, $k$, and $l$ are relatively phase displaced. While these voltages include substantially no even order harmonics, they include all the odd order harmonics generated in the coils. I combine these resultant voltages $i$, $j$, $k$, and $l$ to produce phase A indicated by $\phi_A$ in FIGURE 5. Combination of these resultant voltages in this manner results in an output voltage for the phase having an odd order harmonic content which is substantially reduced.

I combine the voltages generated in the coils 40 making up the B phase in a similar manner to that described hereinabove to produce the wave form $\phi_B$ indicated in FIGURE 5 which has no error resulting from runout, which includes substantially no even order harmonics and which has a greatly reduced odd order harmonic content to cause the wave form to approach very closely that of a sine wave.

Referring now to FIGURE 2, I have indicated the portions of the various phases A and B generated in the coils 38 and 40 carried by the respective poles 1 to 16. From the figure it will be apparent that the A phase is spaced with respect to the B phase by two poles or by an electrical distance of 90°.

Referring now to FIGURE 3, I have shown a developed view of an alternate form of my invention for generating three phases of output voltage. In the particular form of my invention shown in this figure, the stator 50 has twelve poles 51 to 62 while the rotor 64 has fourteen teeth 66. As has been explained hereinabove, since the rotor 64 has a number of teeth which differs by two from the number of stator poles, this form of my invention produces output wave forms which are not affected by runout of the rotor with respect to the stator. The respective stator poles 51 to 62 carry excitation winding coils 68 wound in a manner similar to the coils 32 of the form of my invention shown in FIGURES 1 and 2 and connected in series between terminals 70 and 72. The first or A phase coils 74 carried by the poles 51 to 62 are wound in groups of three in the same sense as the excitation winding coils 68. That is, the coils 74 on poles 51 to 53 are wound in the same sense as the excitation coils 68 carried by these poles, the coils 74 carried by poles 54 to 56 are wound in the opposite sense to the excitation coils 68 carried by these poles, the phase coils 74 carried by poles 57 to 59 are wound in the same sense as the excitation coils on these poles while the phase coils 74 on poles 60 to 62 are wound in the opposite sense to the excitation windings 68 on these poles.

I connect all the phase coils 74 in series between terminals 76 and 78 carrying the A phase output of this form of my invention. The poles 51 to 62 carry respective second or B phase coils 80 connected in series between respective terminals 82 and 84. The coils 80 carried by poles 52 to 54 and by poles 58 to 60 are wound in the same sense as the excitation windings carried by these poles while the coils 80 carried by the poles 55 to 57 and by poles 61, 62 and 51 are wound in the opposite sense to the excitation windings carried by these poles.

The respective poles 51 to 62 carry third or C phase winding coils 86 connected in series between terminals 88 and 90. I wind the coils 86 carried by poles 53 to 55 and by poles 59 to 61 in the same sense as the excitation coils carried by these poles while the windings 86 carried by poles 56 to 58 and by poles 62, 51 and 52 are wound in an opposite sense to the excitation coils 68 carried by these poles.

The output phases of the form of my invention shown in FIGURE 3 are readily arrived at in a manner analogous to that in which the output phases of the form of my invention shown in FIGURES 1 and 2 are arrived at. For purposes of clarity I have shown the components of the output voltages in FIGURE 3. The output voltages of this form of my invention are spaced by 120°.

In operation of the form of my invention shown in FIGURES 1 and 2, the excitation winding made up by coils 32 is energized by the application of either direct current or alternating current to the terminals 34 and 36.

In operation of the form of my variable reluctance device shown in FIGURES 1 and 2 as a reluctance generator, I excite the winding coils 32 from a source of direct current connected to the terminals 34 and 36. With this arrangement as shaft 26 rotates the respective first or A phase winding coils 38 and the second or B phase winding coils 40 produce output signals at the pairs of terminals 42 and 44 and 46 and 48 which are displaced 90° in phase. Owing to the fact that I add coil voltages which are displaced 180° mechanically, the output signals include substantially no error resulting from runout of the rotor with respect to the stator. By adding coil voltages which are displaced by 180 electrical degrees, I substantially eliminate even order harmonics from the output. In the manner described above, I add the phase displaced resultant signals of the sets of coils to produce an output signal in which odd order harmonics are substantially eliminated. As a result the output signals of my device have a wave form which very closely approximates a pure sinusoid.

In use of the form of my variable reluctance device shown in FIGURES 1 and 2 as a resolver, I apply alternating current to the terminals 34 and 36 to produce output signals having a 90° phase relationship representing sine and cosine functions.

In use of the form of my invention shown in FIGURE 3, I may apply direct current to the terminals 70 and 72 to cause the device to function as a three phase reluctance generator. Alternatively I may excite the winding made up by coils 68 with alternating current to cause the device to act as a synchro. This form of my invention functions in a manner analogous to that in which the form of my invention shown in FIGURES 1 and 2 functions to produce output signals which are not appreciably affected by runout of the device, which contains substantially no even order harmonics and in which the number of odd harmonics is substantially reduced.

It will be seen that I have accomplished the objects of my invention. I have provided a variable reluctance device for producing an output wave form which very closely approximates that of a pure sinusoid. The output signals from my device are not appreciably affected by runout between the rotor and stator of the device. I substantially eliminate even order harmonics from the output of my device, and I greatly reduce the odd order harmonic content of the output. My device is adapted for use as a two or as a three phase reluctance generator or alternately as either a resolver or as a synchro.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A variable reluctance device including in combination a first member having a predetermined number of teeth, a second member having a number of teeth differing by at least two from said predetermined number, means mounting said members for relative rotation, an exciting winding mounted on the first member and adapted to produce magnetic flux of the opposite sense in adjacent teeth of said first member and an output winding mounted on the first member, said output winding being adapted to produce flux of the same sense in the respective teeth of each pair of four equally spaced pairs of adjacent teeth of the first member and flux of the opposite sense for all other adjacent teeth of the first member.

2. A variable reluctance device including in combination a stator having 4N teeth where N is an integer greater than one, a rotor having 4N±2 teeth, an exciting winding mounted on the stator and adapted to produce flux of the opposite sense in adjacent stator teeth and an output winding mounted on the stator, said output winding being adapted to produce flux of the same sense in the respective teeth of each pair of four equally spaced pairs of adjacent stator teeth and flux of the opposite sense for all other adjacent stator teeth.

3. A variable reluctance device for producing a plurality of phase-displaced output voltages including in combination a stator having 4N teeth where N is an integer greater than one and where N is integrally divisible by the number of phases, a rotor having 4N±2 teeth, an exciting winding mounted on the stator and adapted to produce flux of the oposite sense in adjacent stator teeth and a number of output windings equal to the number of phases, each output winding being adapted to produce flux of the same sense in the respective teeth of each pair of four equally-spaced pairs of adjacent stator teeth and flux of the opposite sense through all other adjacent stator teeth, the corresponding pairs of adjacent stator teeth in which the various output windings are adapted to produce flux of the same sense being symmetrically spaced.

4. A variable reluctance device including in combination a first member having 8N teeth where N is an integer, said first member providing two adjacent regions of teeth, a second member having 8N±2 teeth, means mounting said members for relative rotation, an excitation winding comprising a number of coils carried by the the respective teeth of said first member, means for energizing said excitation winding to produce flux of the opposite sense in adjacent teeth of said first member, an output winding comprising two groups of coils carried by the respective teeth of two adjacent regions on said first member, and means connecting the coils of said groups in series with the coils of one group in the same sense as the excitation winding coils on the corresponding teeth and with the coils of the other group in the opposite sense to the excitation winding coils on the corresponding teeth.

5. A variable reluctance device including in combination a stator having 8N poles where N is an integer, a rotor having 8N±2 teeth, means mounting said stator and said rotor for relative rotation to provide an air gap between said stator and said rotor, an excitation winding comprising a number of coils carried by said stator poles, a first group of phase winding coils carried by a group of said stator poles, the coils of said first group being of the same sense as the excitation winding coils carried by said poles, a second group of phase winding coils carried by another group of said stator poles, the coils of said second group being of the opposite sense to the excitation winding coils carried by said poles, and means for connecting said phase winding coils in series.

6. A variable reluctance device including in combination a stator having 8N poles where N is an integer, a rotor having 8N±2 teeth, means mounting said stator and said rotor for relative rotation to provide an air gap between said stator and said rotor, an excitation winding comprising a number of coils carried by said stator poles, a first group of phase winding coils carried by a group of said stator poles, the coils of said first group being of the same sense as the excitation winding coils carried by said poles, a second group of phase winding coils carried by another group of said stator poles, the coils of said second group being of the opposite sense to the excitation windings carried by said poles and means for connecting the phase winding coils in series.

7. A variable reluctance device including in combination a stator having 8N poles were N is an integer, a rotor having 8N−2 teeth, means mounting said stator and said rotor for relative rotation to provide an air gap between said stator and said rotor, an excitation winding comprising a number of coils carried by said stator poles, a first group of phase winding coils carried by a group of said stator poles, the coils of said first group being wound on said poles in the same sense as the excitation winding coils carried by said poles, a second group of phase winding coils carried by another group of said stator poles, the coils of said second group being wound on said poles in the opposite sense to the excitation windings carried by said poles and means for connecting the phase winding coils in series.

8. A variable reluctance device including in combination a stator having 8N poles where N is an integer, a rotor having 8N±2 teeth, means mounting said stator and said rotor for relative rotation to provide an air gap between said stator and said rotor, an excitation winding comprising a number of coils carried by said stator poles, adjacent ones of said excitation winding coils being wound in opposite senses on said poles, a first plurality of phase winding coils carried by said stator poles, alternate ones of said phase winding coils being wound on said poles in the same sense as the excitation winding coils carried by said poles, the remaining ones of said phase winding coils being wound on said stator poles in a sense opposite to the excitation winding coils carried by said poles and means for connecting said phase winding coils in series.

9. A variable reluctance device including in combination a stator having 8N poles where N is an integer, a rotor having 8N±2 teeth, means mounting said stator and said rotor for relative rotation to provide an air gap between the stator and the rotor, an excitation winding comprising a number of coils carried by said stator poles, adjacent ones of said excitation winding coils being of the opposite sense, a first phase winding comprising a plurality of coils carried by said stator poles, alternate ones of said first phase winding coils being of the same sense as said excitation winding coils, the remaining ones of said first phase winding coils being of a sense opposite to the excitation winding coils carried by the poles, a second phase winding comprising a plurality of coils carried by said stator poles, alternate ones of said second phase winding coils being of the same sense as the excitation winding coils carried by the poles, the remaining ones of said second phase winding coils being of the opposite sense to the excitation windings carried by said poles, means for connecting the first phase winding coils in series and means for connecting the second phase winding coils in series, said first and second phase windings being spaced by 90 electrical degrees.

10. A variable reluctance device including in combination a stator having 8N poles where N is an integer, a rotor having 8N±2 teeth, means mounting said stator and said rotor for relative rotation to provide an air gap between the stator and the rotor, an excitation winding comprising a number of coils carried by said stator poles, adjacent ones of said excitation winding coils being of the opposite sense, a first phase winding comprising a plurality of coils carried by said stator poles, alternate ones of said first phase winding coils being of the same sense as said excitation winding coils, the remaining ones of said first phase winding coils being of a sense opposite to the excitation winding coils carried by the poles, a second phase winding comprising a plurality of coils carried by said stator poles, alternate ones of said second phase winding coils being of the same sense as the excitation winding coils carried by the poles, the remaining ones of said second phase winding coils being of the opposite sense to the excitation windings carried by said poles, a third phase winding comprising a plurality of coils carried by said poles, alternate ones of the third phase winding coils being of the same sense as the excitation winding coils carried by the poles, the remaining ones of said third phase winding coils being of the opposite sense to the excitation winding coils carried by the poles, means connecting the first phase winding coils in series, means connecting the second phase winding coils in series, and means connecting the third phase winding coils in series, said phase windings being spaced by 120 electrical degrees.

References Cited in the file of this patent
UNITED STATES PATENTS 1,160,087   Neuland ---------------- Nov. 9, 1915